(No Model.)
A. GAMBLE.
FLUID LEVEL.
No. 451,680. Patented May 5, 1891.
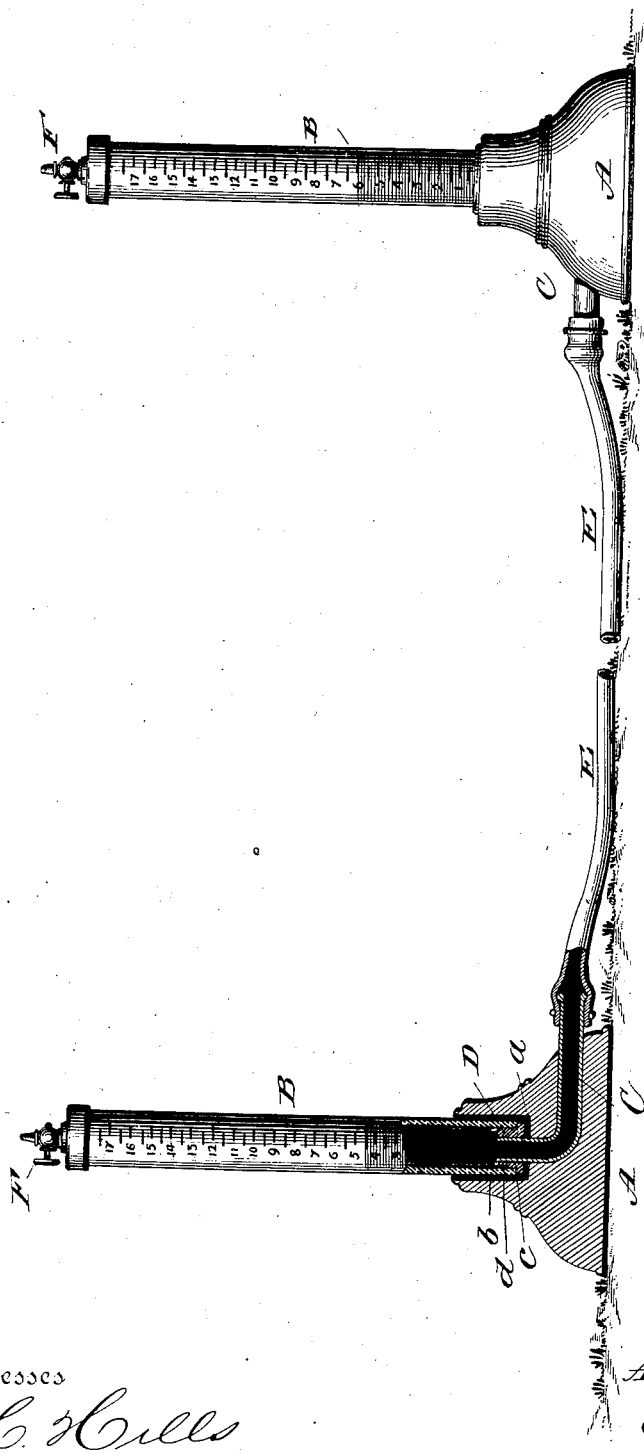
Witnesses
L. C. Hills
E. H. Bond.
Inventor:
Alexander Gamble
E. B. Stocking
Attorney

United States Patent Office.

ALEXANDER GAMBLE, OF HUDSON, WISCONSIN.

FLUID-LEVEL.

SPECIFICATION forming part of Letters Patent No. 451,680, dated May 5, 1891.

Application filed November 5, 1890. Serial No. 370,429. (No model.)

*To all whom it may concern:*

Be it known that I, ALEXANDER GAMBLE, a citizen of the United States, residing at Hudson, in the county of St. Croix, State of Wisconsin, have invented certain new and useful Improvements in Levels, of which the following is a specification, reference being had therein to the accompanying drawing.

This invention relates to certain new and useful improvements in fluid-levels; and it has for its object, among others, to provide a simple, cheap, and efficient portable device of this character by which the difference in height between any two objects may be readily and automatically ascertained and the device made applicable to all the uses to which a leveling-instrument of this character may be put. The tube for connecting the liquid-receptacles is designed to be made extensible, or longer or shorter tubes substituted therefor, according to the character of the work for which it is to be employed.

Other objects and advantages of the invention will hereinafter appear, and the novel features thereof will be more particularly pointed out in the appended claim.

The invention is clearly illustrated in the accompanying drawing, which, with the letters of reference marked thereon, forms a part of this specification, and in which I have shown in side elevation, with parts in section and parts broken away, my improved device as it appears in use.

Referring now to the details of the drawing by letter, A designates a base or support, which may be of any suitable material of the required size and shape and formed with a socket $a$, in which the receptacles B are designed to be held. These receptacles are preferably glass tubes secured in the sockets of the bases by means of plaster-of-paris or some equivalent substance, as seen at the left of the drawing.

D is a cap seated in the lower end of the socket with a flange $c$, upon which the lower end of the tube B is supported, and with an upwardly-extending annular portion $d$, fitted within the lower end of said tube.

C is a pipe or tube having a vertical portion extending up into the cap D, and with a horizontal or inclined portion extending out through the side of the base.

In practice two bases thus constructed are connected by some suitable connection, as a flexible tube E, connecting the ends of the pipes C, as shown, the said flexible tube being connected with the pipe in any suitable manner. This connection will be sufficiently elastic to permit of its extension, or it may be capable of extension in other ways—such, for instance, as by being made telescopic.

The device may be used in various ways and for a variety of purposes. It may be used for leveling shafting, billiard-tables, and other articles. The tubes B are graduated so as to readily designate the difference in height between two objects, or the two portions of one object upon the bases may be resting. Each of the tubes B is provided with a cock F for admitting or allowing the escape of air from the interior of the tube, as it may be desired, to form or destroy a vacuum within the tubes.

Mercury is preferably employed, but other liquid may be used, if desired. Mercury is preferred on account of its specific gravity. It serves to keep the bases steady, and they are not liable to tip or topple over.

What I claim as new is—

The combination, with the base formed with a socket $a$, of the glass receptacle in said socket, the cap D, seated in the lower end of the socket and having flange $c$ at the lower end, upon which the lower end of the receptacle rests, the plastic material $d$, in which the cap and receptacle are seated, and the angular tube C, having its vertical portion extending into said cap and having a horizontal portion extended through the side of the base, substantially as specified.

In testimony whereof I affix my signature in presence of two witnesses.

ALEXANDER GAMBLE.

Witnesses:
JAMES A. FREAR,
E. E. YATCHETT.